(12) United States Patent
Morovic et al.

(10) Patent No.: US 10,897,556 B2
(45) Date of Patent: Jan. 19, 2021

(54) GENERATING AN AREA COVERAGE VECTOR

(71) Applicant: HEWLETT-PACKARD DEVELOPMENT COMPANY, L.P., Spring, TX (US)

(72) Inventors: Peter Morovic, Sant Cugat del Valles (ES); Jan Morovic, London (GB)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/630,356

(22) PCT Filed: Sep. 26, 2017

(86) PCT No.: PCT/US2017/053484
§ 371 (c)(1),
(2) Date: Jan. 10, 2020

(87) PCT Pub. No.: WO2019/066779
PCT Pub. Date: Apr. 4, 2019

(65) Prior Publication Data
US 2020/0186677 A1    Jun. 11, 2020

(51) Int. Cl.
*H04N 1/60* (2006.01)
(52) U.S. Cl.
CPC .................... *H04N 1/60* (2013.01)
(58) Field of Classification Search
None
See application file for complete search history.

(56) References Cited

U.S. PATENT DOCUMENTS

| | | | |
|---|---|---|---|
| 7,436,543 B2 | 10/2008 | Yamamoto et al. | |
| 7,813,001 B2 | 10/2010 | Kubo | |
| 8,773,723 B2 | 7/2014 | Nishikawa | |
| 8,958,636 B1 | 2/2015 | McDougal et al. | |
| 10,506,128 B1 * | 12/2019 | Chadwick | G06T 9/00 |
| 2007/0091337 A1 * | 4/2007 | Morovic | H04N 1/6058 358/1.9 |
| 2010/0214576 A1 | 8/2010 | Morovic | |
| 2011/0096345 A1 * | 4/2011 | Benedicto | H04N 1/6058 358/1.9 |
| 2011/0096364 A1 * | 4/2011 | Morovic | H04N 1/6058 358/3.06 |

(Continued)

FOREIGN PATENT DOCUMENTS

WO   WO-2017184151 A1   10/2017

OTHER PUBLICATIONS

Yongda; "Multi-ink Color-separation Algorithm Improving Image Quality"; Mar. 2008; http://www.ingentaconnect.com/content/ist/jist/2008/00000052/00000002/art00013.

*Primary Examiner* — Anh-Vinh T Nguyen
(74) *Attorney, Agent, or Firm* — HP Inc. Patent Department (57) ABSTRACT

Certain examples described herein relate to generating a Neugebauer Primary area coverage (NPac) vector. In certain cases, a first plurality of Neugebauer Primaries (NPs) defined by a first NPac vector is determined, the first plurality of NPs defining a set of characteristics of a printing process. A second NPac vector, defining a second plurality of NPs, is generated based on the set of characteristics and a criterion relating to the printing process.

20 Claims, 4 Drawing Sheets

(56) References Cited

U.S. PATENT DOCUMENTS

| | | | |
|---|---|---|---|
| 2016/0080612 A1* | 3/2016 | Martinez de Salinas Vazquez | H04N 1/6008 358/3.06 |
| 2016/0155032 A1* | 6/2016 | Morovic | G06K 15/027 358/504 |
| 2016/0182763 A1* | 6/2016 | Morovic | H04N 1/6019 358/3.06 |
| 2017/0048420 A1* | 2/2017 | Morovic | G06K 15/102 |
| 2017/0048421 A1* | 2/2017 | Morovic | H04N 1/6008 |
| 2017/0126931 A1* | 5/2017 | Morovic | H04N 1/6016 |
| 2017/0214821 A1* | 7/2017 | Morovic | H04N 1/644 |
| 2017/0257527 A1* | 9/2017 | Encrenaz | H04N 1/6022 |
| 2017/0324884 A1* | 11/2017 | Morovic | G06F 17/18 |
| 2019/0251405 A1* | 8/2019 | Morovic | H04N 1/00005 |
| 2020/0036866 A1* | 1/2020 | Morovic | H04N 1/60 |
| 2020/0210790 A1* | 7/2020 | Maestro Garcia | H04N 1/00015 |
| 2020/0228675 A1* | 7/2020 | Chadwick | G06T 3/40 |

\* cited by examiner

GENERATING AN AREA COVERAGE VECTOR

BACKGROUND

A printing system may be associated with a color space, defined by colorants available to the printing system for deposition or application to a print medium. An example of a colorant color space is the Cyan, Magenta, Yellow, BlacK (CMYK) color space, wherein four variables are used in a subtractive color model to represent respective quantities of colorants. Examples of colorants include inks, dyes, pigments, paints, toners and powders.

BRIEF DESCRIPTION OF THE DRAWINGS

Various features of the present disclosure will be apparent from the detailed description which follows, taken in conjunction with the accompanying drawings, which together illustrate, by way of example, features of the present disclosure, and wherein.

DETAILED DESCRIPTION

Color can be represented within print and display devices in a large variety of ways. For example, in one case, a color as observed visually by an observer is defined with reference to a power or intensity spectrum of electromagnetic radiation across a range of visible wavelengths. In other cases, a color model is used to represent a color at a lower dimensionality. For example, certain color models make use of the fact that color may be seen as a subjective phenomenon, i.e. dependent on the make-up of the human eye and brain. In this case, a "color" may be defined as a category that is used to denote similar visual perceptions; two colors are said to be similar if they produce a similar effect on a group of people. These categories can then be modelled using a lower number of variables.

Within this context, a color model may define a color space. A color space in this sense may be defined as a multi-dimensional space, with a point in the multi-dimensional space representing a color value and dimensions of the space representing variables within the color model. For example, in a Red, Green, Blue (RGB) color space, an additive color model defines three variables representing different quantities of red, green and blue light. In a digital model, values for these quantities may be defined with reference to a quantized set of values. For example, a color defined using an 8-bit RGB model may have three values stored in a memory, wherein each variable may be assigned a value between 0 and 255. Other color spaces include: a Cyan, Magenta, Yellow and Black (CMYK) color space, in which four variables are used in a subtractive color model to represent different quantities of colorant or printing fluid, e.g. for a printing system; the International Commission on Illumination (CIE) 1931 XYZ color space, in which three variables ('X', 'Y' and 'Z' or 'tristimulus values') are used to model a color; the CIE 1976 (L*, a*, b*—CIELAB or 'LAB') color space, in which three variables represent lightness ('L') and opposing color dimensions ('a' and 'b'); and the Yu'v' color space, in which three variables represent the luminance ('Y') and two chrominance dimensions (u' and v').

Other color spaces include area coverage spaces, such as the Neugebauer Primary area coverage (NPac) color space. An NPac vector in the NPac color space represents a statistical distribution of Neugebauer Primaries (NPs) over an area of a halftone. In a simple binary (bi-level, i.e. two drop states: "drop" or "no drop") printing system or "printer", an NP may be one of $2^k-1$ combinations of k printing fluids within the printing system, or an absence of printing fluid (resulting in $2^k$ NPs in total). A colorant or printing fluid combination as described herein may be formed of one or multiple colorants or printing fluids. For example, if a bi-level printing device uses CMY printing fluids there can be eight NPs. These NPs relate to the following: C, M, Y, CM, CY, MY, CMY, and W (white or blank indicating an absence of printing fluid). An NP may comprise an overprint of two available printing fluids, such as a drop of magenta on a drop of cyan (for a bi-level printer) in a common addressable print area (e.g. a printable "pixel"). An NP may be referred to as a "pixel state".

In multi-level printers, e.g. where print heads are able to deposit N drop levels, an NP may include one of $N^k-1$ combinations of k printing fluids, or an absence of printing fluid (resulting in $N^k$ NPs in total). For example, if a multi-level printer uses CMY printing fluids with four different drop states ("no drop", "one drop", "two drops" or "three drops"), available NPs can include C, CM, CMM, CMMM, etc.

An NPac color space may provide a large number of metamers. Metamerism is the existence of a multitude of combinations of reflectance and emission properties that result in the same perceived color for a fixed illuminant and observer. Colors that are perceived as the same color in this way may be called 'metamers'.

Each NPac vector may therefore define a probability distribution for colorant or printing fluid combinations for each pixel in the halftone (e.g. a likelihood that a particular colorant or printing fluid combination is to be placed at each pixel location in the halftone). In this manner, a given NPac vector defines a set of halftone parameters that can be used in the halftoning process to map a color to NPac vectors to be statistically distributed over the plurality of pixels for a halftone. Moreover, the statistical distribution of NPs to pixels in the halftone serves to control the colorimetry and other print characteristics of the halftone.

Spatial distribution of NPs according to the probability distribution specified in the NPac vector may be performed using a halftone method. Examples of suitable halftoning methods include matrix-selector-based Parallel Random Area Weighted Area Coverage Selection (PARAWACS) techniques and techniques based on error diffusion. An example of a printing system that uses area coverage representations for halftone generation is a Halftone Area Neugebauer Separation (HANS) pipeline.

Certain examples described herein relate to generating a vector in area coverage space, e.g. generating a Neugebauer Primary area coverage (NPac) vector in the NPac color space. The vector may be generated to update an original vector in a color lookup table, e.g. corresponding to an entry stored in the color lookup table. The color lookup table may map between color spaces, storing such mappings as entries in the color lookup table. For example, the color lookup table 150 may map colorimetric values in a color space with vectors in area coverage space.

A color lookup table may be generated by defining mappings between particular locations in two respective color spaces, and storing the mappings as entries, or "nodes", in a data structure, i.e. the color lookup table. Intermediate nodes in the color lookup table (e.g. entries in the color lookup table corresponding to respective locations in a color space that are between particular locations in the color space that have a defined mapping) may be interpolated based on surrounding nodes that are associated with a defined mapping. For example, a regular sampling (e.g. of $17^3$ or $9^4$ entries) may be taken from the color lookup table and interpolated using an interpolation sequence, e.g. ranging from a simple Delaunay tessellation to more advanced methods.

Such interpolation methods may vary in which surrounding nodes are used to interpolate a given new node, however many use a form of convex combination or barycentric coordinate computation and may therefore produce NPac vectors that use the union of sets of colorant combinations, e.g. NPs, defined by each of the NPac vectors corresponding to the nodes used to interpolate the new node.

According to examples described herein, generating the vector in area coverage space is based on a criterion relating to a printing process. For example, an imaging metric corresponding to the criterion may be applied when generating the vector. In this way, the color lookup table may be updated or altered based on the criterion, for example by updating vectors in area coverage space corresponding to entries in the color lookup table with vectors in area coverage space generated based on the criterion.

The criterion may relate to overprinting in a print output generated using a printing process. In examples, the criterion may comprise increasing overprinting in the print output. For example, single-colorant NPs present in an NPac vector may have at least part of the associated area coverage contributions 'transferred' to an area coverage contribution associated with a multi-colorant NP. As an example, if NPs of C and M are present in an NPac vector, at least part of the associated contributions of these NPs may be transferred to an area coverage contribution associated with a multi-colorant NP (CM) in the generated NPac vector, according to examples.

Conversely, in other examples the criterion relating to overprinting comprises decreasing overprinting in the print output. In this case, area coverage contributions of multi-colorant NPs (e.g. CM) may be at least partly transferred to area coverage contributions associated with single-colorant NPs (e.g. C and M).

The criterion may additionally or alternatively relate to whitespace in the print output generated by the printing process, which is discussed in examples below. The imaging metric applied, based on the criterion relating to the printing process, may be different in different regions of the color lookup table. For example, vectors in area coverage space may be generated based on different criteria depending on the entry in the color lookup table that the generated vector is to correspond to, e.g. depending on the colorimetric value in a color space that the generated vector is to map to. In certain examples, there may be different versions of a color lookup table updated from an original color lookup table using generated NPac vectors as described herein. For example, a version of the color lookup table may be updated based on the criterion comprising increasing overprinting. Another version of the color lookup table may be updated based on the criterion comprising decreasing overprinting. The different versions may be used depending on the printing process, e.g. the version based on decreasing overprinting may be used when printing lines onto a print target.

Updating NPac vectors corresponding to entries in a color lookup table with NPac vectors generated according to examples described herein may improve smoothness of the print output. For example, if an NPac vector is updated to increase area coverage contributions of multi-colorant NPs, i.e. that overprint, contrast between different NPs may be lowered. Therefore, the overall printed image, e.g. halftone pattern, may be smoother). In some cases, criteria of both increasing overprinting and decreasing whitespace, e.g. maximizing overprinting and minimizing whitespace, may decrease grain in color separations. Grain may be associated with local contrast between units, e.g. drops, of colorant combinations, and how such local contrast is distributed (e.g. based on a standard deviation of color or lightness differences). Generating an NPac vector based on this combination of imaging metrics may result in the NPac vector comprising NPs that have a lower contrast between each other compared to the NPs of the original NPac vector. This may therefore contribute to a lower grain in the print output.

In other cases, updating NPac vectors corresponding to entries in a color lookup table with NPac vectors generated according to examples described herein may improve line definition in a print output. For example, if an NPac vector is updated to increase area coverage contributions of single-colorant NPs, i.e. that print side-by-side, more of the print target, e.g. print media, may be occupied using the same amount of print material for a given colorant.

Figure 1:
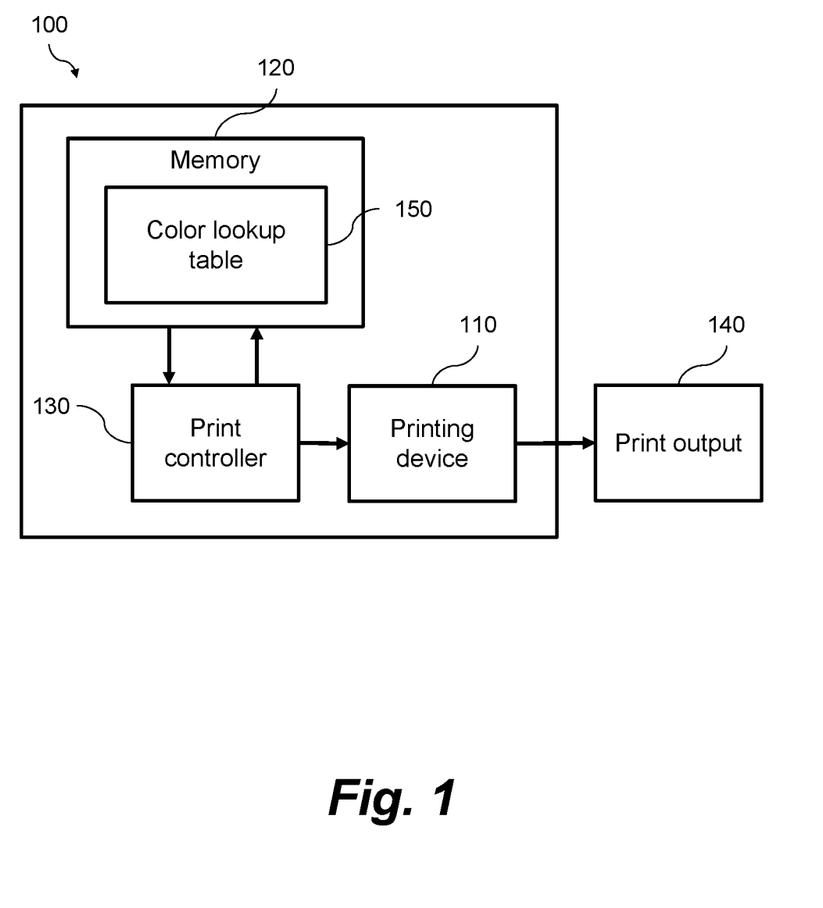
FIG. 1 is a schematic diagram of a printing system according to an example.

FIG. 1 shows a printing system 100 according to an example. Certain examples described herein may be implemented within the context of this printing system.

The printing system 100 may be a 2D printing system such as an inkjet or digital offset printer, or a 3D printing system, otherwise known as an additive manufacturing system. In the example of FIG. 1, the printing system 100 comprises a printing device 110, a memory 120, and a print controller 130. The print controller 130 may be implemented using machine readable instructions and suitably programmed or configured hardware, e.g. circuitry.

The printing device 100 is arranged to apply a print material to a print target in a printing process, for example to produce a print output 140. The print output 140 may, for example, comprise colored printing fluids deposited on a substrate. The printing device 110 may comprise an inkjet deposit mechanism, which may e.g. comprise a nozzle to deposit printing fluid on the substrate. The inkjet deposit mechanism may include circuitry to receive instructions associated with depositing printing fluid. In 2D printing systems, the substrate may be paper, fabric, plastic or any other suitable print medium.

In 3D printing systems, the print output 140 may be a 3D printed object. In such systems, the substrate may be a build material in the form of a powder bed comprising, for example, plastic, metallic, or ceramic particles. Chemical agents, referred to herein as "printing agents", may be selectively deposited onto a layer of build material. In one case, the printing agents may comprise a fusing agent and a detailing agent. In this case, the fusing agent is selectively applied to a layer in areas where particles of the build material are to fuse together, and the detailing agent is selectively applied where the fusing action is to be reduced or amplified. In some examples, colorants may be deposited on a white or blank powder to color the powder. In other examples, objects may be constructed from layers of fused colored powder.

The memory 120 stores a color lookup table 150 to map between color spaces. For example, the color lookup table 150 may map colorimetric values with vectors in the area coverage space. The color lookup table 150 may map RGB or CMYK color values to NPac vectors, for example. In some examples, the color lookup table 150 maps XYZ, LAB or any other color space used to specify the device color space. Where the vectors comprise NPac vectors, the color lookup table 150 may be referred to as a "HANS lookup table". When an RGB mapping is used, the HANS lookup table may comprise $17^3$ entries. When a CMYK mapping is used, the HANS lookup table may comprise $9^4$ entries.

The print controller 130 is arranged to generate a vector in area coverage space, the vector defining a statistical distribution of colorant combinations over an area of a halftone. In examples, the generated vector is an NPac vector.

As part of generating the vector, the print controller 130 is arranged to select from the color lookup table 150 a first vector in area coverage space. For example, the first vector may correspond to an entry in the color lookup table 150. The color lookup table 150 may map to area coverage space, for example from a first color space. The print controller 150 may therefore select an entry in the color lookup table 150 and select the corresponding vector in area coverage space, the said corresponding vector being the first vector. In examples, the memory 120 may store the first vector corresponding to an entry in the color lookup table 150. The first vector may define a statistical distribution of colorant combinations over an area of a halftone. In examples, the first vector comprises an NPac vector. As described, the color lookup table 150 may comprise a HANS lookup table, and the first vector may therefore comprise the NPac vector corresponding to an entry in the HANS lookup table.

As part of generating the vector, the print controller 130 is also arranged to determine a first plurality of colorant combinations based on the first vector. The first plurality of colorant combinations define a set of colorants associated with the printing process. For example, the set of colorants associated with the printing process may be a set of colorants printable by the printing system 100. The printing system 100 may be able to print more colorants than those in the set of colorants defined by the first plurality of colorant combinations. For example, the set of colorants defined by the first plurality of colorant combinations may be a subset of a complete set of available colorants, wherein the complete set of available colorants defines all colorants printable by the printing system 100.

A colorant may be otherwise referred to as a "printing fluid". A colorant may correspond to a given base color, where other colors may be formed from combinations of colorants. Examples of base colors include, but are not limited to, cyan, magenta, yellow, red, green and blue and black. The number of colorants in a given set of colorants is less than the number of possible colorant combinations, e.g. NPs, based on the given set of colorants.

The first vector may define, for each of the first plurality of colorant combinations, a likelihood that a given colorant combination in the first plurality of colorant combinations is to be placed at a given location in an image, e.g. a given pixel location in a halftone. For example, the first vector may comprise a plurality of components, each component corresponding to a colorant combination in the first plurality of colorant combinations. A given component of the first vector may comprise a value corresponding to a likelihood that a colorant combination corresponding to the given component is to be placed at the given location in the image. In examples where the first vector is an NPac vector, the first plurality of colorant combinations may correspond to a first plurality of NPs.

As part of generating the vector in area coverage space, the print controller 130 generates a second vector in area coverage space defining a second plurality of colorant combinations. For example, the second vector may have components corresponding to colorant combinations comprised in the second plurality of colorant combinations. Generation of the second vector is based on the set of colorants defined by the first plurality of colorant combinations. This generation of the second vector is also based on a criterion relating to the printing process. For example, the colorant combinations used as the second plurality of colorant combinations, and the corresponding values (e.g. relating to area coverage) comprised in the second vector, may be determined based on the criterion.

In examples, as part of generating the vector, the print controller 130 is also arranged to determine an intermediate plurality of colorant combinations based on the set of colorants defined by the first plurality of colorant combinations. As an illustrative example, the first vector could comprise three components corresponding to three colorant combinations: [C, CM, YY]. In this example, the first plurality of colorant combinations would therefore comprise C, CM, and YY and the set of colorants defined by the first plurality of colorant combinations would comprise C, M, and Y. The print controller 130 may determine the intermediate plurality of colorant combinations from the base colorants C, M, and Y, i.e. based on the set of colorants defined by the first plurality of colorant combinations.

The intermediate plurality of colorant combinations may comprise some or all the colorant combinations in the first plurality of colorant combinations. The intermediate plurality of colorant combinations may additionally or alternatively comprise a colorant combination not present in the first plurality of colorant combinations. For example, the print controller 130 may combine colorants in the set of colorants defined by the first plurality of colorant combinations to generate a colorant combination not present in the first plurality of colorant combinations. Such generated colorant combinations may be included in the intermediate plurality of colorant combinations, e.g. in addition to the colorant combinations comprised in the first plurality of colorant combinations. Returning to the illustrative example, the print controller 130 may combine the colorants M and Y from the set of colorants to generate a colorant combination MY not present in the first plurality of colorant combinations (C, CM, and YY).

In alternative examples, the print controller 130 may determine the intermediate plurality of color combinations by selecting combinations of the colorants in the set of colorants from a plurality of colorant combinations associated with the printing process. For example, the plurality of colorant combinations associated with the printing process may be a plurality of colorant combinations that are printable by the printing system 100. In some examples the plurality of colorant combinations associated with the printing process may be a predetermined plurality of colorant combinations, i.e. all colorant combinations that are printable by the printing system 100. All the colorant combinations that are printable by the printing system 100 may be termed a "valid" set of colorant combinations. Therefore, the print controller 130 may select colorant combinations in the valid set of colorant combinations that are combinations of the colorants in the set of colorants. Again, returning to the illustrative example, combinations of the colorants C, M, and Y may be selected from the valid set of colorant combinations, e.g. which may comprise CC, CY, YC, MM, MY, YM. In examples, colorant combinations in the valid set of colorant combinations that comprise colorants not present in the set of colorants defined by the first plurality of colorant combinations are not selected.

In examples, the criterion relating to the printing process relates to overprinting in a print output generated using the printing process. An overprint may comprise a unit (e.g. a drop) of one available colorant deposited on top of a unit of another available colorant in a common addressable print area (e.g. a pixel). For example, the colorant combination CM may correspond to an overprint of one drop of magenta (M) on top of one drop of cyan (C). In some cases, the criterion may comprise increasing overprinting. In certain cases, the criterion comprises maximizing overprinting. Maximizing overprinting may correspond to increasing the amount of overprinting in the print output, e.g. increasing the proportional area of the print output that is overprinted, subject to constraints. Examples of such constraints are discussed further below. As an illustrative example, to increase overprinting when generating the second vector in area coverage space, the print controller 130 may use overprint colorant combinations from the intermediate plurality of colorant combinations. Additionally, or alternatively, the print controller 130 may give a larger area coverage value to components of the second vector that correspond to overprint colorant combinations, relative to components of the second vector that do not correspond to overprint colorant combinations.

In other cases, the criterion comprises decreasing overprinting. This may correspond to increasing side-by-side printing of colorants. Side-by-side printing may involve printing units of colorants next to one another rather than on top of one another as in overprinting (e.g. depositing a drop each of C and M next to each other in an addressable print area as opposed to a drop of M on top of one drop of C). In these examples, the print controller 130 may use non-overprint colorant combinations from the intermediate plurality of colorant combinations, e.g. single-colorant combinations. Additionally, or alternatively, the print controller 130 may give a larger area coverage value to components of the second vector that correspond to single-colorant combinations, relative to components of the second vector that correspond to overprint colorant combinations. In examples the criterion comprises decreasing overprinting, which may correspond to decreasing the amount of overprinting in the print output, e.g. decreasing the proportional area of the print output that is overprinted, subject to constraints. In certain cases, the criterion comprises minimizing overprinting.

In examples, the criterion may additionally or alternatively relate to whitespace in the print output generated by the printing process. For example, the criterion may comprise increasing or decreasing whitespace in the print output. "Whitespace" may be considered a portion of a print target or image, e.g. the print output, which does not have print material, e.g. a colorant, applied to it. Therefore, decreasing whitespace may corresponding to reducing the proportion of the print target that is left blank. In some cases the criterion comprises minimizing whitespace, for example decreasing the amount of whitespace as much as possible subject to constraints. As an illustrative example, to decrease whitespace when generating the second vector in area coverage space, the print controller 130 may give a smaller area coverage to a component of the second vector that corresponds to a blank (W) colorant combination (i.e. indicating an absence of colorant e.g. printing fluid), relative to other components of the second vector that correspond to non-blank colorant combinations.

In examples, the generating of the second vector by the print controller 130 is based on an adjustment of a relation involving colorant combinations in a given set of colorant combinations in an intermediate plurality of colorant combinations, and corresponding area coverages. The intermediate plurality of colorant combinations may comprise the valid set of colorant combinations in some examples. In other examples, the intermediate plurality of colorant combinations may comprise a subset of the valid set, e.g. colorant combinations generated or selected, as described in examples above. The relation may involve a certain number of colorant combinations corresponding to the number of components in the second vector to be generated. The relation may include colorant combinations in the given set of colorant combinations, and corresponding area coverages, as variables. Therefore, different input colorant combinations, selected from the set of colorant combinations, and corresponding area coverages, may give different outputs from the relation. In examples, adjusting the relation may include improving the relation between colorant combinations in the given set of colorant combinations, e.g. optimizing the relation. The relation may be considered a function of the variable colorant combinations and corresponding area coverages, e.g. an objective function.

A metric based on the criterion may be applied to the given set of colorant combinations. For example, colorant combinations may be weighted differently in the relation, with weightings dependent on the criterion. As an example, if the criterion were to increase overprinting, and adjusting the relation comprised reducing an output value of the function of the variable colorant combinations and corresponding area coverages, e.g. minimizing an objective function, the colorant combinations may be weighted to penalize blank space and single-colorant combinations relative to overprint combinations. In this way, adjustment of the relation may favor colorant combinations that are associated with the criterion, e.g. overprint combinations when the criterion comprises increasing overprinting. The metric applied to the given set of colorant combinations may be hierarchical. For example, if the criterion were to increase overprinting, blank colorant combinations may be penalized more than single-colorant combinations, which in turn may be penalizes relative to overprint combinations.

In some examples, a further metric based on the set of colorants defined by the first plurality of colorant combinations is applied to the intermediate plurality of colorant combinations. For example, colorant combinations may be weighted differently in the relation, with weightings dependent on colorants comprised in the colorant combinations. In examples, colorant combinations in the intermediate plurality of colorant combinations that comprise colorants not in the set of colorants may be weighted to penalize those colorant combinations. This may be an alternative to deriving a subset of the valid set of colorant combinations, as described above in examples. For example, the valid set of colorant combinations may be used as the intermediate plurality of colorant combinations, and weightings may be applied to the colorant combinations in the valid set, the weightings based on whether a given colorant combination comprises colorants not present in the first plurality of colorant combinations.

In examples, the adjustment of the relation comprises a constraint wherein a second colorant-use vector, determinable based on the second plurality of colorant combinations and corresponding area coverages used to generate, i.e. defining, the second vector, is equivalent to a first colorant-use vector determined based on the colorant combinations and corresponding area coverages defined by the first vector. A colorant-use vector may comprise components corresponding to individual colorants, where values of the components correspond respectively to the amount of the corresponding colorant used relative to the other colorants represented in the colorant-use vector. Component values of a colorant-use vector may therefore be determined based on colorant combinations and corresponding relative area coverages, e.g. from a vector in area coverage space, such as an NPac vector. In certain cases, the first colorant-use vector is determined as described above, and the colorant combinations and corresponding area coverages selectable to generate the second vector are those that would give a colorant-use vector equivalent to the first colorant-use vector. Equivalent colorant-use vectors may comprise the same value per component, wherein the vector components correspond respectively to the amount of the corresponding colorant used relative to the other colorants represented in the colorant-use vector, as described above.

In examples, a set of colorant combinations and corresponding area coverages that improve the relation are selected as components of the second vector. For example, where the relation is considered a function, e.g. an objective function, of the variable colorant combinations and corresponding area coverages, and adjusting the relation comprises minimizing the objective function, e.g. subject to constraints, the colorant combinations and corresponding area coverages selected to form the second vector may be those that minimize an output of the objective function, e.g. give the minimum output value possible based on the available input variables. As an example, for a colorant-use vector of [Cyan 50%, Magenta 50%], and the criterion comprising minimizing whitespace, the set of colorant combinations and corresponding area coverages that gives the minimum output value may be 01:0.5, M1:0.5, wherein C1 and M1 denote one unit, or 'drop', of Cyan and Magenta colorant, respectively. The second vector [01:0.5, M1:0.5] comprising this set of colorant combinations and corresponding area coverages as components gives an output value of zero (i.e. the minimum) for the objective function, as there in no blank W component present in the second vector. If the criterion were to maximize whitespace, the set of colorant combinations and corresponding area coverages that gives the maximum output value may be CCMM:0.25, W:0.75, where 0, 1 or 2 units of each colorant are possible. This set of colorant combinations and corresponding area coverages gives an output value of 0.75 for the objective function, and may be selected as the components of the second vector.

In examples, the print controller 130 is to update the first vector with the second vector in the color lookup table 150 stored in the memory 120. For example, the print controller 130 may update the entry in the color lookup table 150 that maps to the first vector to instead map to the second vector. The color mapping represented by the color lookup table 150 may be applied to print job data, for example in a printing operation performed by the printing system 100. In examples, the first vector may be adjusted to correspond to the second vector. In other examples, the first vector may be replaced by the second vector, e.g. the first vector may be deleted from a memory location and the second vector stored at the memory location.

Figure 2:
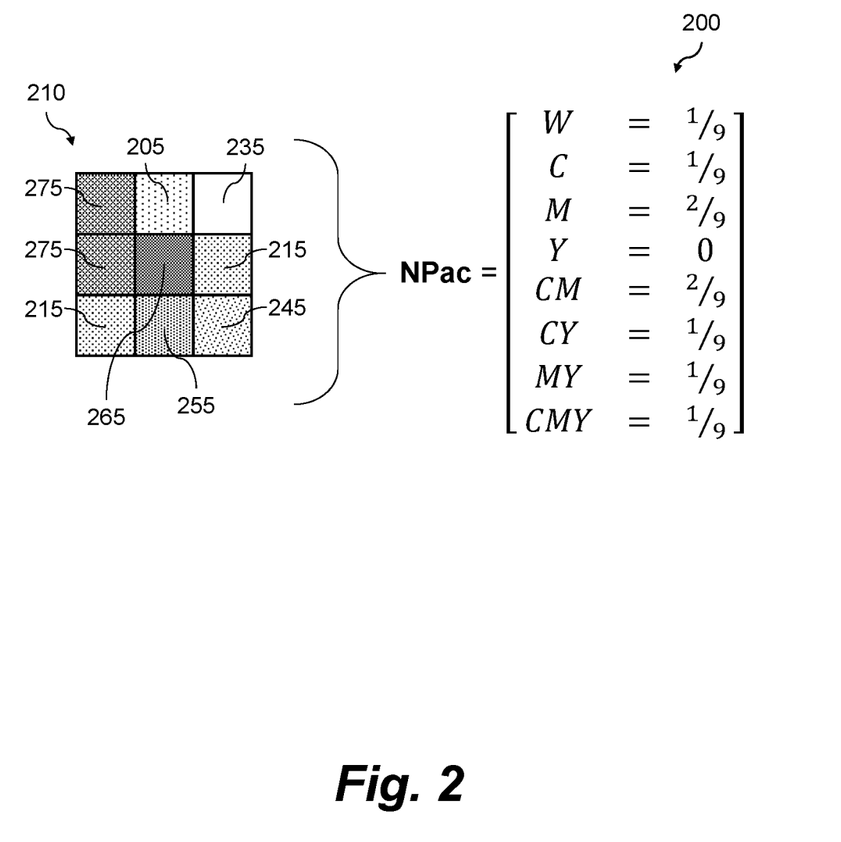
FIG. 2 is a schematic diagram showing a representation of a Neugebauer Primary area coverage vector according to an example.

FIG. 2 shows an example NPac vector 200 for use in a CMY imaging system. The NPac vector 200 may be a generated NPac vector resulting from a method performed in accordance with examples described herein. This example shows a three-by-three pixel area 210 of a print output where all pixels have the same NPac vector: vector 200. The NPac vector 200 defines the probability distributions for each NP for each pixel, for example a likelihood that $NP_x$ is to be placed at the pixel location. Hence, in the example print output there is one pixel of White (W) (235); one pixel of Cyan (C) (245); two pixels of Magenta (M) (215); no pixels of Yellow (Y); two pixels of Cyan+Magenta (CM) (275); one pixel of Cyan+Yellow (CY) (255); one pixel of Magenta+Yellow (MY) (205); and one pixel of Cyan+Magenta+Yellow (CMY) (265). Generally, the print output of a given area is generated such that the probability distributions set by the NPac vectors of each pixel are fulfilled. For example, the NPac vector may be effected by a halftone stage that implements the spatial distribution of colorants combinations defined by the vector, e.g. via a series of geometric shapes such as dots of predetermined sizes being arranged at predetermined angles. As such, an NPac vector is representative of the colorant overprint statistics of a given area. Although a CMY system is used for ease of explanation, other imaging systems may be used.

Figure 3:
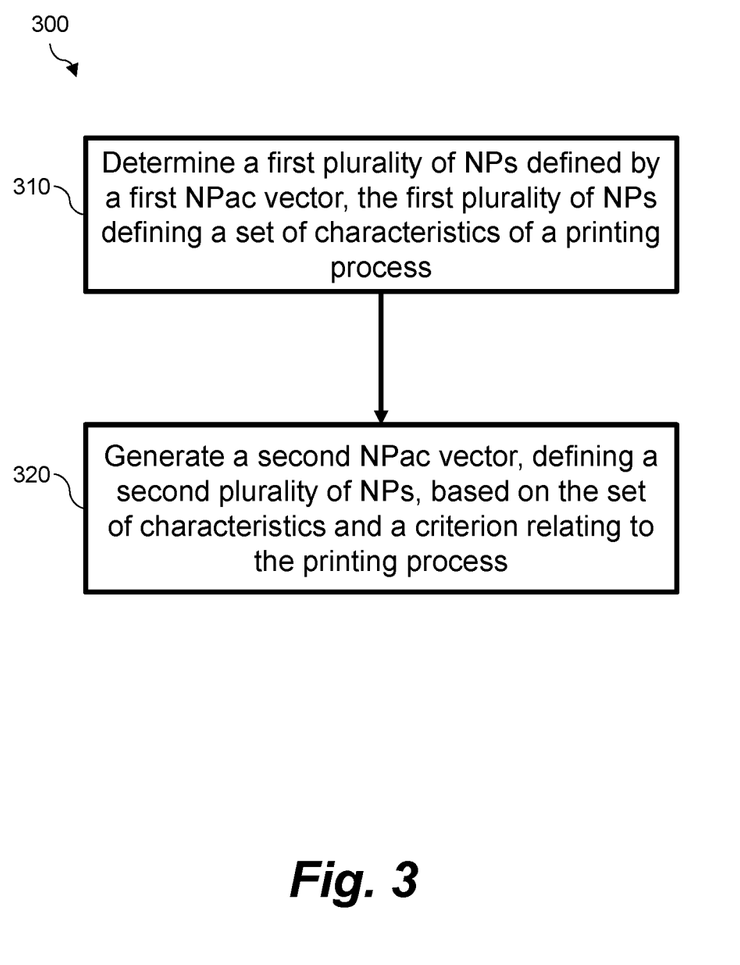
FIG. 3 is a flow chart illustrating a method of generating a Neugebauer Primary area coverage vector according to an example.

FIG. 3 shows a method 300 of generating a Neugebauer Primary area coverage (NPac) vector according to an example. In some examples, the method 300 is performed by a print controller such as the print controller 130 of FIG. 1. The print controller may perform the method based on instructions retrieved from a computer-readable storage medium. The printing system may comprise the printing system 100 of FIG. 1.

At item 310, a first plurality of Neugebauer Primaries (NPs) is determined. The first plurality of NPs is defined by a first NPac vector. For example, the first NPac vector may comprise components corresponding respectively to NPs in the first plurality of NPs. The first NPac vector may be selected in examples, e.g. from a HANS lookup table, or from a memory based on a corresponding entry in the HANS lookup table. The HANS lookup table may be stored in the memory. The memory may be comprised in or separate from the printing system.

The first plurality of NPs define a set of characteristics of a printing process. The printing process may be performable by the printing system 100, and may comprise applying print material to a print target. In examples, the set of characteristics comprises a set of colorants associated with the printing process. For example, the set of colorants may comprise colorants that are printable in the printing process, e.g. by the printing system. The set of colorants may be combined to give each NP in the first plurality of NPs.

At item 320, a second NPac vector, defining a second plurality of NPs, is generated based on the set of characteristics and a criterion relating to the printing process. Example criterions include those previously described with reference to the printing system 100 of FIG. 1. For example, the criterion may relate to overprinting or whitespace in a print output generated using the printing process. For example, the criterion may comprise increasing or decreasing overprinting and/or increasing or decreasing whitespace in the print output. In some cases, determining the intermediate plurality of NPs may also be based on the criterion. For example, certain NPs may be excluded or not selected based on the criterion to be applied at item 320. As an example, if the criterion comprises increasing overprinting, single-colorant NPs may be omitted from the intermediate plurality of NPs, e.g. when determining the intermediate plurality of NPs based on the set of characteristics, e.g. the set of colorants. Similarly, generating the second NPac vector based on the set of characteristics may correspond to examples previously described with reference to the printing system 100 of FIG. 1. For example, the second plurality of NPs may be determined from an intermediate plurality of NPs based on the set of characteristics, e.g. the set of colorants defined by the first plurality of NPs. The intermediate plurality of NPs may be a predetermined plurality of NPs, e.g. the valid set of NPs, as previously described, and determining the second plurality of NPs may comprise weighting NPs in the predetermined plurality of NPs. Weightings may depend on whether a given NP comprises a colorant not present in the set of colorants.

In some examples, the intermediate plurality of NPs is determined, based on the set of characteristics. For example, where the set of characteristics is a set of colorants, the colorants in the set of colorants may be combined to give the intermediate plurality of NPs. Determining the intermediate plurality of NPs may therefore comprise generating colorant combinations from the set of colorants. A limit may be implemented in the generation of colorant combinations from the set of colorants, for example a maximum number of different colorants combinable in a colorant combination, and/or a maximum number of units (e.g. drops) represented in a colorant combination. Such limits may allow the generation of colorant combinations from the set of colorants to not continue ad infinitum. In examples where the first plurality of NPs does not comprise a blank NP, e.g. W, the blank NP is not selected when determining the intermediate plurality of NPs.

In alternative examples, determining the intermediate plurality of NPs comprises selecting NPs from the predetermined plurality of NPs associated with the printing process. For example, the predetermined plurality of NPs associated with the printing process may comprise all NPs printable or "valid" in the printing process. The NPs selected from the predetermined plurality of NPs may correspond to combinations of colorants in the set of colorants defined by the first plurality of NPs. For example, NPs comprising a colorant not present in the set of colorants may not be selected when determining the intermediate plurality of NPs.

In examples, the method 300 involves determining a first colorant-use vector based on the first plurality of NPs and corresponding area coverages defined by the first NPac vector. As described, a colorant-use vector may comprise components corresponding to individual colorants, where values of the components correspond respectively to the amount of the corresponding colorant used relative to the other colorants represented in the colorant-use vector. Component values of a colorant-use vector may therefore be determined based on NPs and corresponding relative area coverages defined by an NPac vector.

The method 300 may also include generating the second NPac vector such that a second colorant-use vector, determinable based on the second plurality of NPs and corresponding area coverages defined by, i.e. used to generate, the second NPac vector, is equivalent to the first colorant-use vector.

In examples, the method 300 may involve applying an imaging metric to the intermediate plurality of NPs, the imaging metric corresponding to the criterion. The intermediate plurality of NPs may comprise the second plurality of NPs. A relation between NPs in a given set of NPs in the intermediate plurality of NPs may be determined as part of the method 300, which may also include determining the second plurality of NPs as a set of NPs from the intermediate plurality of NPs, and corresponding area coverages, based on the relation, e.g. that improve or optimize the relation. As described above, the intermediate plurality of NPs may comprise the valid set of NPs, or a subset thereof, or a set of NPs generated based on the set of characteristics, e.g. colorants.

For example, applying an imaging metric to the intermediate plurality of NPs may comprise weighting NPs in the intermediate plurality of NPs differently for input to the relation, with weightings dependent on the criterion. As an example, if the criterion comprises increase overprinting, and improving the relation comprises reducing an output of an objective function within constraints, the NPs in the intermediate plurality of NPs may be weighted to penalize blank space and single-colorant NPs relative to overprint NPs. In this way, improving the relation may favor NPs that are associated with the criterion, e.g. overprint NPs if the criterion comprises increasing overprinting. The metric applied to the given set of colorant combinations may be hierarchical. For example, if the criterion comprises increasing overprinting, a blank NP may be penalized more than single-colorant NPs, which in turn may be penalized relative to overprint NPs.

Area coverages corresponding to NPs, e.g. in an NPac vector, may comprise a value in a range of 0 to 1, or [0, 1], since the area coverages represent probabilities. If the criterion comprises increasing overprinting, applying the imaging metric to the intermediate plurality of NPs may comprise giving the blank NP (e.g. W) a relative weight of 10000, for example. Single-colorant NPs may be given a relative weight of 100, and overprint or multi-colorant NPs may be given a relative weight of 1. These relative weightings may therefore produce a relation between a given set of NPs in the intermediate plurality of NPs, e.g. an objective function, that penalizes whitespace most, followed by single-colorant NPs and has nominal values for multi-colorant NPs that accord with the criterion of increasing overprinting. In this example, an error from 0.1% of blank space may be 1, while an error of 1 would be achieved if a single multi-ink NP were at 100% coverage. Hence, output values corresponding to blank NPs may weigh orders of magnitude more than those caused by NPs that are in accordance with the criterion.

In examples, the method 300 comprises generating the second NPac vector may include generating the second NPac vector using the second plurality of NPs and corresponding area coverages determined to improve the relation.

In examples, determining the relation between a given set of NPs in the intermediate plurality of NPs is based on constraints. The constraints may include a second colorant-use vector, determinable based on the second plurality of NPs and corresponding area coverages used to generate, i.e. define, the second NPac vector, corresponding to, for example being equivalent to, a first colorant-use vector determined based on the first plurality of NPs and corresponding area coverages defined by the first NPac vector. In certain cases, the first colorant-use vector is determined as described above, and the second plurality of NPs and corresponding area coverages selectable to generate the second vector are those that would give a colorant-use vector equivalent to the first colorant-use vector. This constraint may correspond to an equality condition when improving the relation.

The constraints may include a predetermined minimum area coverage of each NP defined by, i.e. used to generate, the second NPac vector. For example, as area coverages in an NPac vector represent probabilities, a minimum area coverage value of zero may be set as a constraint. This may mean that negative area coverages are not allowed in the generated second NPac vector. In other examples, the predetermined minimum area coverage may be greater than zero. This may result in fewer NPs used to generate, and thus defined by, the second NPac vector, e.g. compared to the number of NPs associated with the first NPac vector. This constraint may correspond to an inequality condition when improving the relation.

Similarly, the constraints may include a predetermined maximum area coverage of each NP defined by, i.e. used to generate, the second NPac vector. For example, as area coverages in an NPac vector represent probabilities, a maximum area coverage value of one may be set as a constraint. This may mean that any area coverage value, corresponding to an NP, in the generated second NPac vector may not exceed the print area addressable by the NPac vector. This constraint may correspond to an inequality condition when improving the relation.

The constraints may include a predetermined total area coverage of the NPs defined by, i.e. used to generate, the second NPac vector. For example, a sum of all area coverages in the generated second NPac vector equivalent to a maximum possible probability, e.g. 1, may be set as a constraint. This constraint may correspond to an equality condition when improving the relation.

Improving the relation between NPs in the given set of NPs in the intermediate plurality of NPs, i.e. when determining the second plurality of NPs, may comprise applying a linear programming (LP) method, a random sample consensus (RANSAC) method, or a Monte Carlo method.

For example, linear programming may be implemented by defining the relation between the given set of NPs in the intermediate plurality of NPs as a linear objective function. The given set of NPs may be variables in the linear objective function that can each take a value corresponding to an NP in the intermediate plurality of NPs. Corresponding area coverages for the given set of NPs may also be variables in the linear objective function. The linear objective function may be subject to the constraints described above. LP techniques may involve finding values of the variables of the linear objective function that improve, e.g. increase or decrease, an output value of the linear objective function within the constraints. A feasible region or solution space, e.g. a superset of all sets of values of the variables that satisfy the constraints, may be defined by the constraints that the linear objective function is subject to. The solution space of an LP technique may be a convex polytrope defined by convex constraints, and the LP technique may involve metric minimization subject to said convex constraints.

In alternative examples, the solution space define by the constraints, e.g. a convex hull (defined by the inequality constraints) intersected with hyperplanes (defined by the equality constraints), may be sampled or traversed while evaluating the objective function to improve, e.g. optimize, the relation analytically.

RANSAC or Monte Carlo techniques may additionally or alternatively be implemented to take (pseudo-)random samples of variable values, e.g. which are generated. Each potential set of variable values may be compared to the constraints described above, and the objective function may be evaluated.

As an illustrative example of the present method 300 of generating a Neugebauer Primary area coverage (NPac) vector, a first NPac vector may comprise NPs having the following area coverages: [YYY: 0.152859, mYY: 0.486241, mYYY: 0.00840452, YYa: 0.0715979, YYYa: 0.00123757, YYN: 0.043207, RR: 0.19126100, RRR: 0.0451916]. A first plurality of NPs defined by the first NPac vector may be determined at item 310 as: YYY, mYY, mYYY, YYa, YYYa, YYN, RR, and RRR. The first plurality of NPs define a set of characteristics, e.g. a set of colorants: m, a, Y, R, N. In this example, an intermediate plurality of NPs may be determined based on the set of characteristics m, a, Y, R, N. For example, the intermediate plurality of NPs may include NPs such as YR and YN that are not in the first plurality of NPs. The intermediate plurality of NPs may also include the first plurality of NPs defined by the first NPac vector. For example, the intermediate plurality of NPs may comprise a larger set of valid NPs, i.e. NPs printable by a printing system, than the first plurality of NPs. The intermediate plurality of NPs may comprise a subset of a larger valid set of NPs, i.e. comprising all NPs printable by the printing system. In this example, a second NPac vector may be generated, at item 320, using NPs from the intermediate plurality of NPs, based on a criterion relating to the printing process. In this example, the criterion comprises increasing overprinting. In this example, generating the second NPac vector based on the set of characteristics comprises determining the intermediate plurality of NPs, from which the second plurality of NPs can be chosen to generate the second NPac vector based on the criterion. In other examples, the intermediate plurality of NPs may comprise a predetermined plurality of NPs (e.g. the valid set of NPs) and generating the second NPac vector based on the set of characteristics comprises selecting the second plurality of NPs from the intermediate plurality of NPs based on the set of characteristics in parallel with the criterion. For example, a colorant metric, based on the set of characteristics (e.g. colorants) defined by the first plurality of colorant combinations may be applied to the intermediate plurality of NPs (or colorant combinations).

Continuing the example, an imaging metric corresponding to the criterion may be applied to the intermediate plurality of NPs, e.g. to weight the NPs according to their correspondence with the criterion. A relation between a given set of NPs in the intermediate plurality of NPs may be determined and then improved to determine a 'solution' comprising a set of NPs from the intermediate plurality of NPs and corresponding area coverages. In this example, the improving is performed using an LP technique, as described, and constrained by the two inequality conditions and two equality conditions previously described. The 'solution' set of NPs and corresponding area coverages may be used in this example to generate the following second NPac vector: [mY: 0.451717256667, Ya: 0.029907206667, YN: 0.021742868333, YR: 0.1411030675, YYYR: 0.334065469167, mmYYRRaaN: 0.021464131667]. The second NPac vector comprises no NP corresponding to a single colorant (e.g. the NPs YYY, RR, RRR of the first NPac vector are not present in the second NPac vector) in accordance with the criterion to increase overprinting. Therefore, no pixel in the halftone uses Yellow on its own, but all instead combine yellow with other colorants (e.g. a, R, and N). This may reduce contrast in the print output since all NPs are of a more similar lightness in the second NPac vector than in the first NPac vector.

In this illustrative example, the first NPac vector corresponds to an entry, or "node", in a color lookup table that maps from the coordinate (240, 64, 0) in RGB color space. As described, the color lookup table may be stored in a memory accessible by a print controller comprised in the printing system. The first NPac vector may be updated with the generated second NPac vector in the color lookup table. In this example, the generated second NPac vector replaces the first NPac vector as corresponding to the node in the color lookup table that maps from the coordinate (240, 64, 0) in RGB color space. Therefore, the coordinate (240, 64, 0) in RGB color space will map to the second NPac vector via the color lookup table (e.g. HANS lookup table) instead of the first NPac vector, as done previously.

Figure 4:
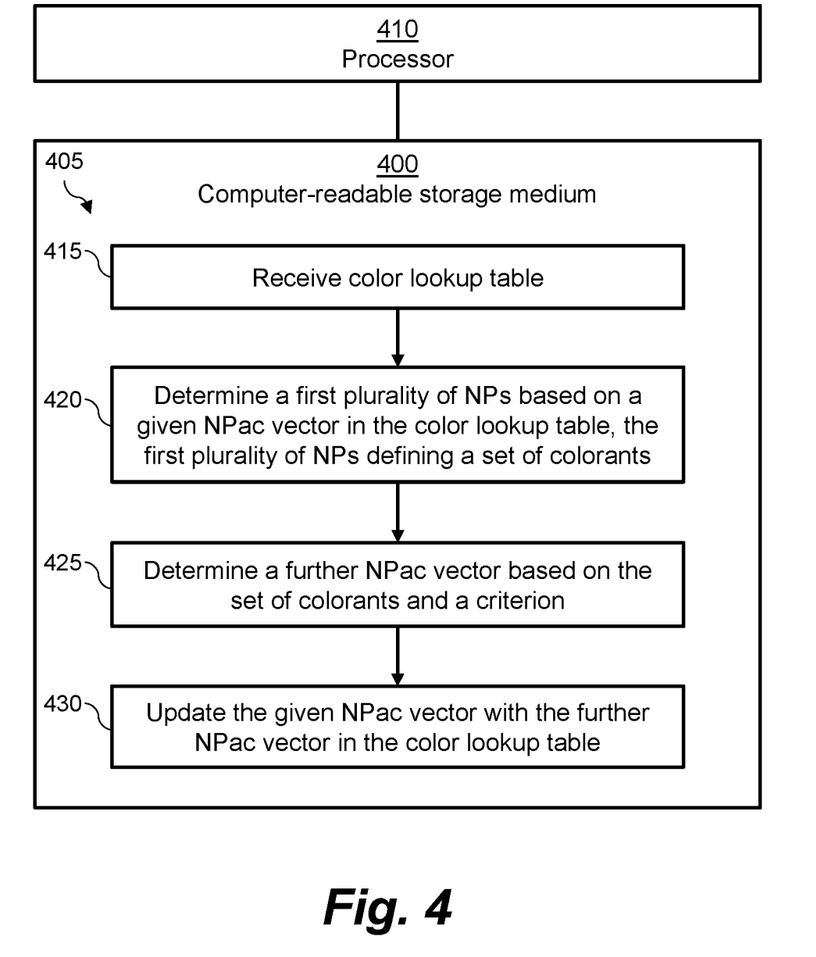
FIG. 4 is a schematic diagram of a processor and a computer readable storage medium with instructions stored thereon according to an example.

FIG. 4 shows a non-transitory computer-readable storage medium 400 comprising a set of computer-readable instructions 405. The computer-readable storage medium 400 is connectably coupled to a processor 410. The processor 410 and the computer-readable storage medium 400 may be components of a printing system, for example. The printing system may comprise a printing system similar to printing system 100. The set of computer-readable instructions 405 may be executed by the processor 410.

Instruction 415 instructs the processor 410 to receive a color lookup table comprising a plurality of Neugebauer Primary area coverage (NPac) vectors. The color lookup table may be stored in memory within the printing system, for example. Alternatively, the color lookup table may be stored in memory external to the printing system. In examples, the plurality of NPac vectors may correspond respectively to entries in the color lookup table. For example, the color lookup table may be a HANS lookup table that maps from a first color space to area coverage space, wherein the plurality of NPac vectors are defined with respect to area coverage space.

Instruction 420 instructs the processor 410 to determine a first plurality of Neugebauer Primaries (NPs) based on a given NPac vector in the color lookup table. For example, the processor 410 may select the given NPac vector using the color lookup table. In examples, the processor 410 selects an entry in the color lookup table (e.g. HANS lookup table) and reads the corresponding NPac vector in area coverage space as the given NPac vector. The first plurality of NPs determined based on the given NPac vector define a set of colorants associated with a printing process, as previously described.

Instruction 425 instructs the processor 410 to determine a further NPac vector, defining a second plurality of NPs, based on the set of colorants and a criterion relating to the printing process. For example, the criterion may comprise increasing or decreasing overprinting, and/or increasing or decreasing whitespace. Determining the further NPac vector may be done using an optimization technique, for example LP, RANSAC, and/or Monte Carlo. The optimization may involve defining a solution space based on constraints, as described in examples, e.g. each area coverage component of the generated further NPac vector having a (normalized) value in the range [0, 1]. The optimization may also involve defining a relation, e.g. an objective function, based on variables representing a given set of NPs in the intermediate plurality of NPs and corresponding area coverages. The optimization technique used may then determine the set of NPs and corresponding area coverages that optimize the relation, e.g. maximize or minimize the objective function, and those NPs and corresponding area coverages may be used to generate the further NPac vector.

In examples, the processor 410 is instructed to determine an intermediate plurality of NPs based on the set of colorants. For example, the processor 410 may generate colorant combinations, e.g. NPs, from the set of colorants defined by the first plurality of NPs associated with the given NPac vector, as described in examples. Alternatively, as also described in examples, the processor 410 may select colorant combinations from a superset, e.g. a "global" valid set, of colorant combinations, the selected colorant combinations comprising combinations of the colorants in the set of colorants. For example, if the processor 410 determined that the set of colorants defined by the first plurality of NPs comprised colorants M, m, and Y (where 'm' represents light magenta), the processor 410 may proceed to select, from the global valid set of NPs, NPs having combinations of the colorants M, m, and Y, e.g. mmY, MYY, YM etc.

In other examples, the processor 410 is instructed to apply a colorant metric to an intermediate plurality of NPs comprising the valid set of colorant combinations when determining the further NPac vector based on the set of colorants. For example, the colorant metric may be based on the set of colorants, and may weight a given NP, i.e. colorant combination, in the valid set based on whether the given NP comprises a colorant not present in the set of colorants defined by the first plurality of NPs.

Instruction 430 instructs the processor 410 to update the given NPac vector with the further NPac vector in the color lookup table. For example, the given NPac vector may correspond to a given entry, or node, in a color lookup table that maps from a given coordinate in a first color space to the given NPac vector in area coverage space. As described, the color lookup table may be stored in a memory accessible by the processor 410.

In examples, the processor 410 replaces the given NPac vector with the generated further NPac vector, such that the further NPac vector corresponds to the given node in the color lookup table that maps from the given coordinate in the first color space. Therefore, when the color lookup table (e.g. HANS lookup table) is used to map the given coordinate, e.g. by the processor 410 during a printing operation, the given coordinate may map to the further NPac vector instead of the original given NPac vector.

In examples, a plurality of NPac vectors in the color lookup table, i.e. corresponding respectively to entries in the color (or HANS) lookup table, may be updated by a plurality of further NPac vectors generated by methods as described. For example, the processor 410 may be instructed by the set of instructions 405 for a plurality of NPac vectors in the color lookup table. Therefore, the color lookup table may be updated based on the processor 410 updating a plurality of original NPac vectors to newly generated NPac vectors. For example, the generated NPac vectors may be determined based on improving a relation between component NPs and corresponding area coverages subject to constraints. Each generated NPac vector may have an associated colorant-use vector corresponding to, for example equivalent to, a colorant-use vector associated with a corresponding original in the color lookup table. In certain cases, all original NPac vectors in the color lookup table, e.g. corresponding to entries in a HANS lookup table mapping from a first color space to area coverage space, are updated with respective NPac vectors that are generated according to examples described herein.

Processor 410 can include a microprocessor, microcontroller, processor module or subsystem, programmable integrated circuit, programmable gate array, or another control or computing device. The computer-readable storage medium 400 can be implemented as one or multiple computer-readable storage media. The computer-readable storage medium 400 includes different forms of memory including semiconductor memory devices such as dynamic or static random access memory modules (DRAMs or SRAMs), erasable and programmable read-only memory modules (EPROMs), electrically erasable and programmable read-only memory modules (EEPROMs) and flash memory; magnetic disks such as fixed, floppy and removable disks; other magnetic media including tape; optical media such as compact disks (CDs) or digital video disks (DVDs); or other types of storage devices. The computer-readable instructions 405 can be stored on one computer-readable storage medium, or alternatively, can be stored on multiple computer-readable storage media. The computer-readable storage medium 400 or media can be located either in a printing system or located at a remote site from which computer-readable instructions can be downloaded over a network for execution by the processor 410.

Generating NPac vectors in examples described herein is based on a criterion relating to the printing process. In some examples, the criterion used may depend on a position of an NPac vector in the original color lookup table. For example, a first region of the color lookup table may have a first criterion applied when generating NPac vectors to update respective original NPac vectors in the first region of the color lookup table. A second region of the color lookup table may have a second criterion, e.g. different to the first criterion, applied when generating NPac vectors to update respective original NPac vectors in the second region of the color lookup table. For example, entries in the color lookup table corresponding to lighter colors in the first color space may have NPac vectors generated, to update original NPac vectors corresponding to said entries, based on a criterion comprising decreasing whitespace in the print output. In this example, entries in the color lookup table corresponding to darker colors in the first color space may have NPac vectors generated based on a different criterion, e.g. increasing overprinting.

Certain examples described herein enable a reduction in the number of NP components in an NPac vector having the same determinable colorant-use vector. Consolidating the NPs in this way may allow fewer NPs to each cover larger areas, which may improve half-toning in the print output.

The preceding description has been presented to illustrate and describe examples of the principles described. This description is not intended to be exhaustive or to limit these principles to any precise form disclosed. Many modifications and variations are possible in light of the above teaching.

For example, examples are envisaged where the constraints (that adjusting, or improving, the relation between the given set of NPs in the intermediate plurality of NPs is subject to) include a predetermined maximum number of NPs used to generate the second NPac vector. This constraint may be a quadratic constraint, in which case non-linear adjustment, e.g. non-linear optimization, of the relation between the given set of NPs and associated area coverages may be implemented to determine the set of NPs and corresponding area coverages to use in generating, i.e. to define, the second NPac vector.

What is claimed is:
1. A method of generating a Neugebauer Primary area coverage (NPac) vector, comprising:
  determining a first plurality of Neugebauer Primaries (NPs) defined by a first NPac vector, the first plurality of NPs defining a set of characteristics of a printing process;
  generating a second NPac vector defining a second plurality of NPs, based on:
    the set of characteristics; and
    a criterion relating to the printing process; and
  providing the second NPac vector for use in processing print job data when printing a corresponding print job.

2. The method of claim 1, wherein the set of characteristics defined by the first plurality of NPs comprises a set of colorants associated with the printing process.

3. The method of claim 2, wherein generating the second NPac vector based on the set of characteristics comprises generating colorant combinations from the set of colorants.

4. The method of claim 2, wherein generating the second NPac vector based on the set of characteristics comprises selecting NPs from a predetermined plurality of NPs associated with the printing process, the selected NPs corresponding to combinations of colorants in the set of colorants.

5. The method of claim 1, comprising:
  determining a first colorant-use vector based on the first plurality of NPs and corresponding area coverages defined by the first NPac vector; and
  wherein the second NPac vector has an associated second colorant-use vector, the second colorant-use vector being determinable based on the second plurality of NPs and corresponding area coverages defined by the second NPac vector,
  wherein the second colorant-use vector comprises a same set of component values as the first colorant-use vector.

6. The method of claim 1, wherein the criterion relates to:
  overprinting; or
  whitespace;
  in a print output generated using the printing process.

7. The method of claim 1, comprising:
  applying an imaging metric to an intermediate plurality of NPs comprising the second plurality of NPs, the imaging metric corresponding to the criterion;
  determining a relation between NPs in a given set of NPs in the intermediate plurality of NPs; and
  determining the second plurality of NPs as a set of NPs from the intermediate plurality of NPs, and corresponding area coverages, based on the relation;
  wherein the generating the second NPac vector comprises generating the second NPac vector using the determined second plurality of NPs and corresponding area coverages.

8. The method of claim 7, wherein determining the relation between NPs in a given set of NPs in the intermediate plurality of NPs is based on constraints including:
  a second colorant-use vector, determinable based on the second plurality of NPs and corresponding area coverages defined by the second NPac vector, the second colorant-use vector being equivalent to a first colorant-use vector determined based on the first plurality of NPs and corresponding area coverages defined by the first NPac vector;
  a predetermined minimum area coverage of each NP defined by the second NPac vector;
  a predetermined maximum area coverage of each NP defined by the second NPac vector; and
  a predetermined total area coverage of the NPs defined by the second NPac vector.

9. The method of claim 7, wherein determining the second plurality of NPs from the intermediate plurality of NPs, and corresponding area coverages, comprises applying:
  a linear programming (LP) method;
  a random sample consensus (RANSAC) method; or
  a Monte Carlo method.

10. The method of claim 1, further comprising updating an entry in a color lookup table that maps to the first vector to, instead, map to the second vector.

11. The method of claim 10, further comprising applying a color mapping of the color lookup table to print job data.

12. The method of claim 10, further comprising:
preparing different versions of the color lookup table using the second vector; and
selecting a version of the color lookup table to apply to print job data based a parameter of the print job data.

13. The method of claim 12, wherein the parameter of the print job data comprises a parameter specifying increased or decreased overprinting.

14. A printing system comprising:
a printing device to apply a print material to a print target in a printing process;
a memory storing a color lookup table to map between color spaces; and
a print controller to generate a vector in area coverage space, the vector defining a statistical distribution of colorant combinations over an area of a halftone, by:
selecting from the color lookup table a first vector in area coverage space;
determining a first plurality of colorant combinations based on the first vector, the first plurality of colorant combinations defining a set of colorants associated with the printing process; and
generating a second vector in area coverage space, defining a second plurality of colorant combinations, based on the set of colorants and a criterion relating to the printing process.

15. The printing system of claim 14, wherein the generating the second vector is based on a relation involving a given set of colorant combinations in an intermediate plurality of colorant combinations, the intermediate plurality comprising the second plurality of colorant combinations, and corresponding area coverages,
wherein a metric is applied to the given set of colorant combinations, the metric based on the criterion.

16. The printing system of claim 15, wherein generating the second vector based on the relation comprises applying a constraint wherein a second colorant-use vector, determinable based on the second plurality of colorant combinations and corresponding area coverages defining the second vector, is equivalent to a first colorant-use vector determined based on the colorant combinations and corresponding area coverages defined by the first vector.

17. The printing system of claim 15, wherein the second plurality of colorant combinations and corresponding area coverages are selected as components of the second vector based on an output value of the relation involving the second plurality of colorant combinations and corresponding area coverages as the given set of colorant combinations and corresponding area coverages.

18. The printing system of claim 14, wherein the print controller is to update the first vector with the second vector in the color lookup table.

19. The printing system of claim 14, wherein the print controller is to update the first vector with the second vector in the color lookup table by deleting the first vector from a particular memory location and storing, instead, the second vector at the particular member location.

20. A non-transitory computer-readable storage medium comprising a set of computer-readable instructions that, when executed by a processor of a printing system, cause the processor to:
receive a color lookup table comprising a plurality of Neugebauer Primary area coverage (NPac) vectors;
determine a first plurality of Neugebauer Primaries (NPs) based on a given NPac vector in the color lookup table, the first plurality of NPs defining a set of colorants associated with a printing process;
determine a further NPac vector, defining a second plurality of NPs, based on the set of colorants and a criterion relating to the printing process; and
update the given NPac vector with the further NPac vector in the color lookup table.

\* \* \* \* \*